US012750536B2

(12) United States Patent
Clout et al.

(10) Patent No.: US 12,750,536 B2
(45) Date of Patent: Sep. 29, 2026

(54) SYSTEMS AND METHODS FOR JUST IN TIME TRANSCODING OF VIDEO ON DEMAND

(71) Applicant: Qumu Corporation, Minneapolis, MN (US)

(72) Inventors: Henry John Hamilton Clout, Surrey (GB); Chad Eliott Sears, Hayden, ID (US)

(73) Assignee: QUMU CORPORATION, Minneapolis, MN (US)

( * ) Notice: Subject to any disclaimer, the term of this patent is extended or adjusted under 35 U.S.C. 154(b) by 634 days.

(21) Appl. No.: 18/157,803

(22) Filed: Jan. 20, 2023

(65) Prior Publication Data

US 2023/0239534 A1 Jul. 27, 2023

Related U.S. Application Data

(60) Provisional application No. 63/303,374, filed on Jan. 26, 2022.

(51) Int. Cl.

| | |
|---|---|
| ***H04N 21/233*** | (2011.01) |
| ***H04N 21/2343*** | (2011.01) |
| *G10L 19/16* | (2013.01) |

(52) U.S. Cl.

CPC ..... *H04N 21/2335* (2013.01); *H04N 21/2343* (2013.01); *G10L 19/167* (2013.01); *G10L 19/173* (2013.01)

(58) Field of Classification Search

None

See application file for complete search history.

(56) References Cited

U.S. PATENT DOCUMENTS 9,288,510 B1 * 3/2016 Yang .............. H04N 21/234309
10,469,860 B1 * 11/2019 Zhang .................... H04N 19/48

(Continued)

FOREIGN PATENT DOCUMENTS

KR 102074148 B1 * 8/2011
TW I446775 B * 7/2014

OTHER PUBLICATIONS

Stoll, Gerhard; ISO-MPEG-2 Audio: A Generic Standard for the Coding of Two-Channel and Multichannel Sound [PDF]; Institut fur Rundfunktechnik, Munich, Germany; Paper RED-005; 1996 Available: https://aes2.org/publications/elibrary-page/?id=7133 (Year: 1996).*

(Continued)

*Primary Examiner* — Pierre Louis Desir
*Assistant Examiner* — Sean Thomas Smith
(74) *Attorney, Agent, or Firm* — IPTechLaw

(57) ABSTRACT

Systems and methods for just in time (JIT) video on demand (VOD) transcoding using a computed context are provided. The context for each segment is computed rather than collected from the prior segment, thereby allowing for very short playback timing compared to batch transcoding techniques. Computed context requires the setting of a predictable media segment size, computing of a predictable playback time stamp (PTS) as a function of the predictable media segment size and a derived time offset value, and generating a prior audio segment including a priming portion and discard samples, and a "real" audio segments including playback samples. Then generating another primed segment for the time period of the "real" audio segment, and a subsequent "real" audio segment. This doubles the computational resources required over batch audio transcoding.

20 Claims, 14 Drawing Sheets

(56) References Cited

U.S. PATENT DOCUMENTS

| | | | | |
|---|---|---|---|---|
| 10,917,668 | B1 * | 2/2021 | Henaire | H04N 21/8456 |
| 11,025,919 | B2 * | 6/2021 | da Silva Pratas Gabriel | H04N 19/162 |
| 2012/0179700 | A1 * | 7/2012 | Eagleston | G10L 19/00 707/756 |
| 2014/0153909 | A1 * | 6/2014 | MacInnis | H04N 21/242 386/353 |
| 2015/0281752 | A1 * | 10/2015 | Van Veldhuisen | H04N 21/233 725/116 |
| 2016/0308958 | A1 * | 10/2016 | Navali | H04L 65/60 |
| 2020/0037014 | A1 * | 1/2020 | Dahl | H04N 21/234309 |
| 2020/0344510 | A1 * | 10/2020 | McMurray | H04N 21/23109 |

OTHER PUBLICATIONS

Mendoza, T. Alejandro, et al. "Video and audio compression the MPEGS standards." Florida International University, Advanced Topics of Information Processing (2001). (Year: 2001).*

Gao, Y. (2009). Audio Coding Standard Overview: MPEG4-AAC, HE-AAC, and HE-AAC V2. In: Luo, FL. (eds) Mobile Multimedia Broadcasting Standards. Springer, Boston, MA. https://doi.org/10.1007/978-0-387-78263-8_21 (Year: 2009).*

Sodagar, Iraj. "The mpeg-dash standard for multimedia streaming over the internet." IEEE multimedia 18.4 (2011): 62-67. (Year: 2011).*

"Timecode Standards." Steinberg Documentation, 2017, archive.steinberg.help/cubase_pro_artist/v9/en/cubase_nuendo/topics/synchronization/synchronization_timecode_standards_c.html#:~:text=For%20example%2C%20NTSC%20timecode%20(SMPTE,that%20runs%20at%2029.97%20realtime. (Year: 2017).*

* cited by examiner

SYSTEMS AND METHODS FOR JUST IN TIME TRANSCODING OF VIDEO ON DEMAND

CROSS-REFERENCE TO RELATED APPLICATION

This application claims the benefit and priority of U.S. Provisional Application No. 63/303,374, filed Jan. 26, 2022, which is incorporated herein in its entirety by this reference.

BACKGROUND

The present invention relates in general to the field of video transcoding, and more specifically to just in time (JIT) transcoding that allows for reduced timing for playback. Such systems and methods are useful to for allowing content creators to stream their generated video and audio content to consumers of the content without long transcoding times.

The generation of video content for consumption by many users (one to many) is of great value to companies and individuals that wish to share ideas and concepts with an audience. Before a recording can be viewed, however, it needs to be transcoded. Transcoding is the conversion of one digital encoding to another digital encoding. Transcoding is necessary because the player device may have different requirements than the source file when doing Video on Demand (VOD).

Transcoding is well known and is a necessary aspect of streaming video on demand. There are many known transcoding services available. These transcoding services rely upon context from one segment to the next. As such, traditional transcoding is a batch process. The transcoding time is thus given by the following equation:

$$\text{Transcoding}-\text{time} = \text{video}-\text{duration} \times C$$

Where C is a constant based upon the transcoding service. Some transcoding services have much smaller values for the constant C, however, for longer videos, the transcoding time can still be significant. For example, one of the fastest transcoding services, as of the date of this application being filed is mux.com. Even using this fast service, transcoding can take a minute for a 10 minute video. For a three hour video, the transcoding time can take 18 minutes. Put bluntly, a user simply is often unwilling to wait this amount of time to view their content.

As such, the existing systems used for transcoding video on demand are woefully inadequate for any situation where the video length is appreciable. It is therefore apparent that an urgent need exists for systems and methods for Just in Time (JIT) transcoding that eliminates a dependency of the transcoding length being tied to video length. Such systems and methods are designed to provide the user with improved VOD experiences.

SUMMARY

The present systems and methods relate to improving Video on Demand experiences. In particular, the present systems and methods improve the transcoding of the video to decouple the relationship between video length and transcoding time. Such systems and methods enable improvements the user's ability to access the video content in a timely manner.

In some embodiments, the context for each segment is computed rather than collected from the prior segment. This just in time (JIT) video on demand (VOD) transcoding using a computed context requires the setting of a predictable media segment size, computing of a predictable playback time stamp (PTS) as a function of the predictable media segment size and a derived time offset value, and generating a prior audio segment including a priming portion and discard samples, and a "real" audio segment including playback samples. Then generating another primed segment for the time period of the "real" audio segment, and a subsequent "real" audio segment. This doubles the computational resources required over batch audio transcoding.

In some embodiments, the predictable media segment size is 6.4 seconds. In others it is 8 seconds. The audio sample rate may be 48 Khz. And the video frame rate may be 30 frames per second. The priming portion of the discardable audio segments may be 1024 samples, and are silent.

In some embodiments, the rendering of the video is by fast and accurate seeking to a given frame and rendering the segment starting with an i-frame. The process includes generating a root manifest, a rendition manifest, and rendering audio and video media.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
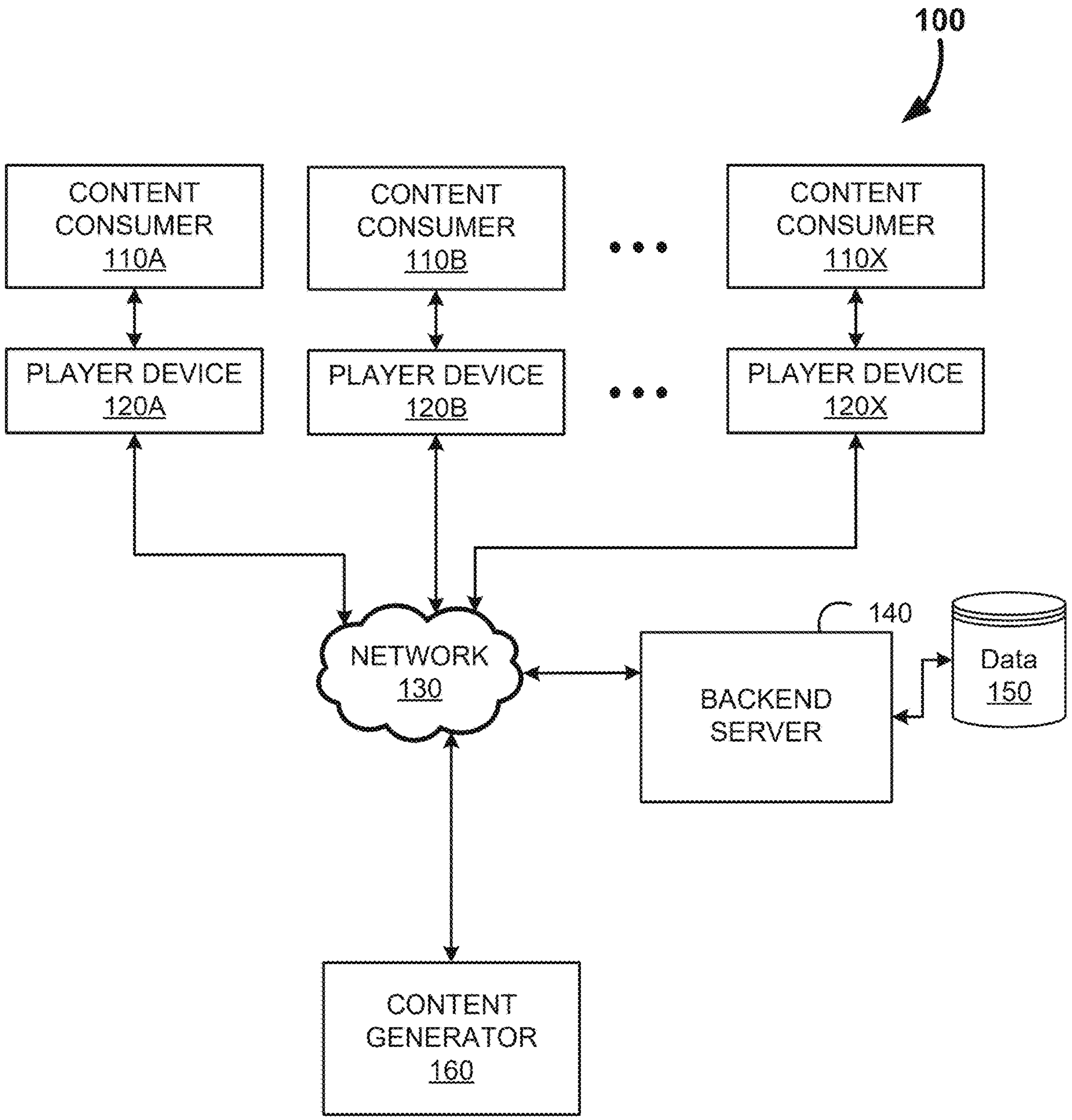
FIG. 1A is an example block diagram of a system for a video on demand (VoD) architecture, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "only," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for the transcoding of video on demand (VOD). In particular, the present transcoding service is a serial, just in time (JIT) transcoding service that decouples the transcoding time from the length of the video. It should be noted, however, that video on demand generally includes a video/visual element and an audio element, the following systems and methods may apply to situations where only video is being transcoded, or conversely, where only audio is being transcoded. Thus, while this disclosure may center upon a VOD including a video and audio subcomponents, it is not intended to limit the scope of this disclosure or the functioning of the instant systems and methods.

Further, it should be noted that the sets of embodiments detailed in this disclosure are for illustrative purposes only, and are not intended to artificially limit the scope of the invention. As such, terms such as "must", "can't" "will" and other such limiting language, is intended to only apply to the one instant embodiment being contemplated. Such restrictions are not intended to expand to other embodiments which may have a scope significantly broader than the instant substantiation.

In order to facilitate the discussion, FIG. 1A provides an example environment where transcoding of Video on Demand (VOD) is necessary for proper display of content on devices, shown generally at 100. In this example, a content generator 160 produces content for consumption. The content generator 160 may include any content source, such as a corporate marketing department, communications/public relations department, human resources or legal departments (generally for internal content consumption), governments, or even individual users (as individuals or as part of a larger entity).

The generated content is transmitted over a network 130 to a backend server 140, which stores the content in a data store 150, and performs the streaming necessary to distribute the content as VoD. The data store may include any known data storage architecture. In some embodiments, structured query language (SQL) may be employed to manage the data store 150.

The network may include any known network types, such as a local area network (LAN), a wide area network, a wireless LAN (WLAN), a cellular network, an internal corporate network, or some combination thereof. In some embodiments, the network 130 may include the Internet for transmission of the content from the content generator 160 to the server 140.

The backend server 140 accesses the data store 150 when specific content is requested by a player device 120*a-x*. Content is then transcoded to the requirements of the player device 120*a-x* and sent, via the network 130, to the player device as video on demand. The player device 120*a-x* displays/plays the content for a content consumer/user 110*a-x*.

In some embodiments, the player device 120*a-x* includes any computing device for playback of content. Generally, the only requirements for these devices is that they include audio and video interfaces (a screen and either an audio jack or speakers). Often these player devices include a desktop computer system, a laptop, a tablet or a smart phone.

The transcoding process may occur in the backend server 140, in some embodiments. In alternate embodiments, a transcoder service which is separate from the backend server 140 may be employed to perform the actual transcoding process (not illustrated). Regardless of the actual transcoding location, the resulting formatted content is then passed along to the player device 120*a-x*, as discussed above.

Figure 1B:
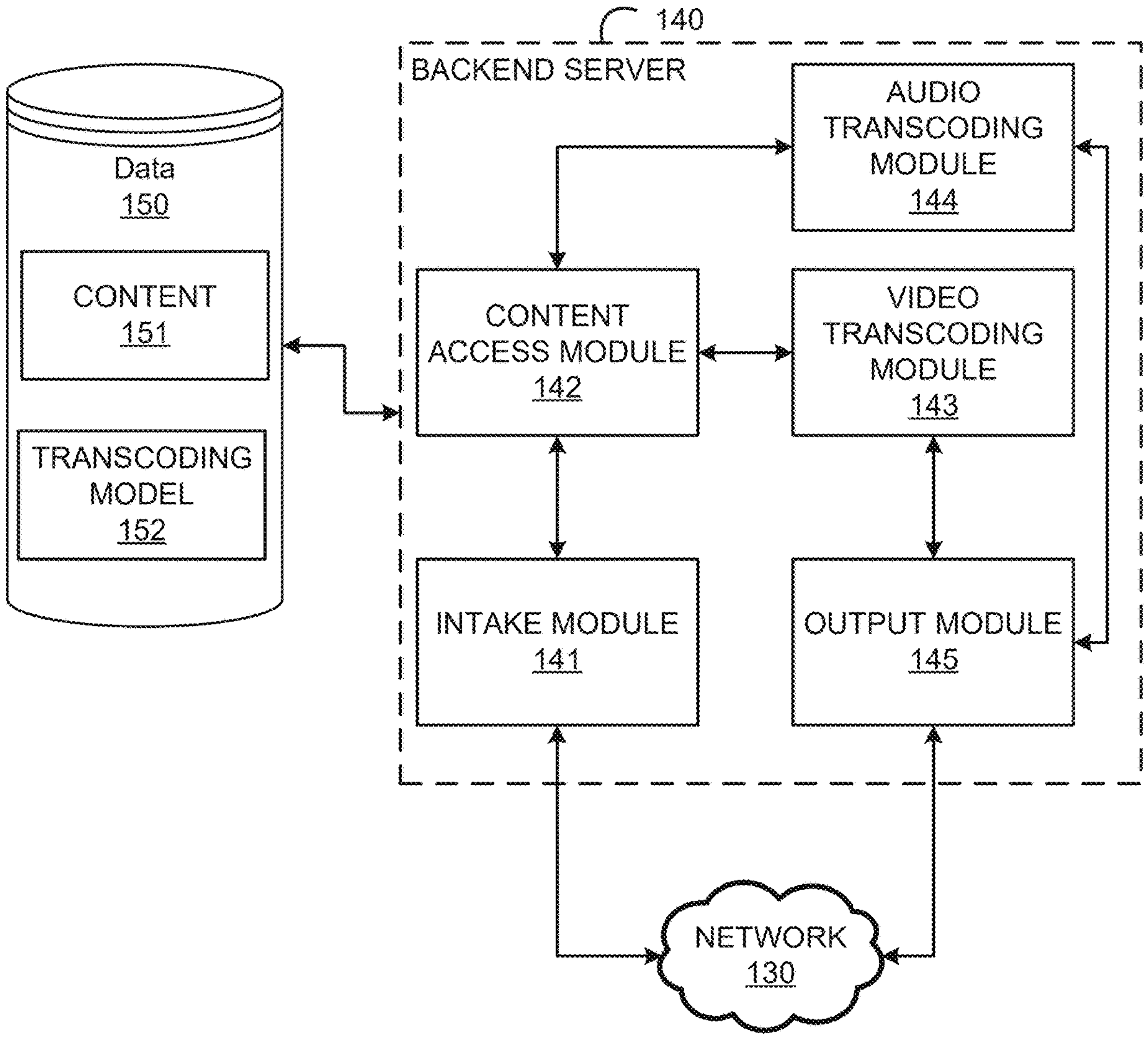
FIG. 1B is an example block diagram for the VOD backend server, in accordance with some embodiment.

FIG. 1B provides more details of the backend server 140 when this element performs the transcoding functions. Here it can be seen that the data store 150 includes not only the content data 151, but also the code/model 152 for performing the transcoding service. The network 130 couples to an intake module 141, which receives generated content 151, and provides it to the data store 150 for later access. When a request for the content is received from a content consumer 110*a-x*, via their player device 120*a-x*, a content access module 142 pulls up the content 151 from the data store 150 for processing and output as video on demand. The content access module 142 may include a file management system, as the amount of content 151 stored in the data store 150 may be quite large.

Once the content has been retrieved, it is sent to a pair of modules for processing. The first module employed is a video transcoding module 143, which utilizes computed context, which will be described in considerable detail below, to serially transcode the video portion of the content, based upon the player device's 120*a-x* requirements. The second module 144 also employs computed context to transcode the audio portion of the content. These transcoded audio and video segments are then transferred, just in time (JIT) as streaming content to the player device 120*a-x* via an output module 145 (again via the network 130).

Figure 2A:
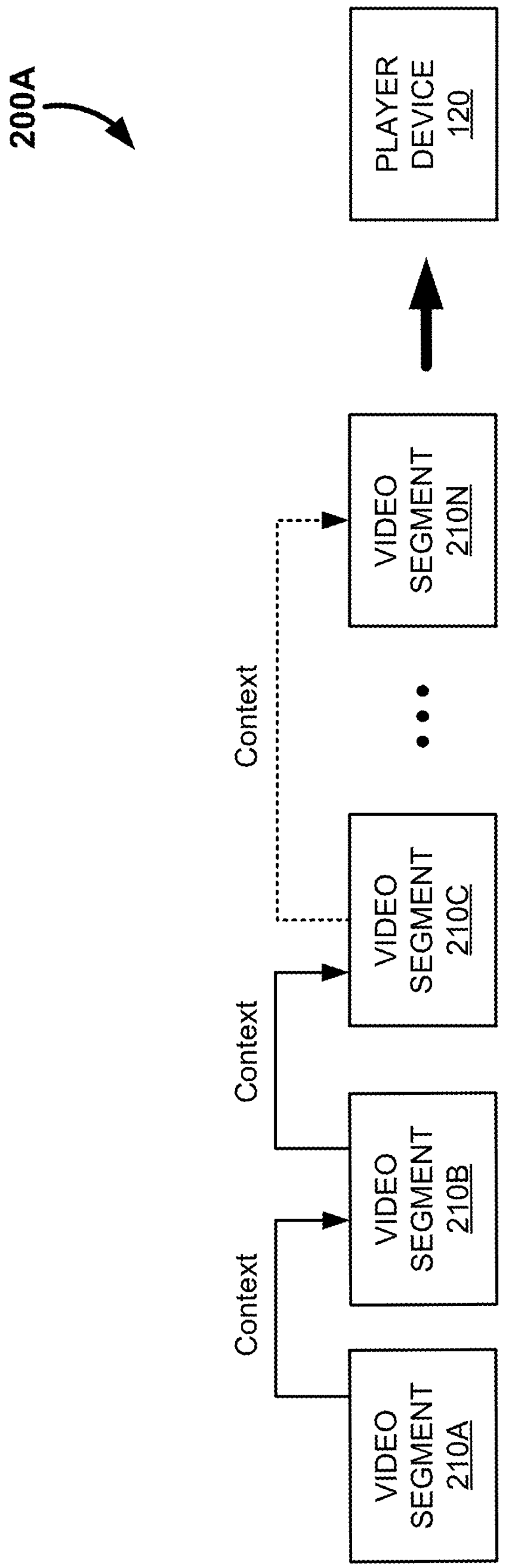
FIG. 2A is an example block diagram for a traditional batch transcoding service, in accordance with some embodiment.

In order to better understand the novel transcoding process described in greater detail in this disclosure, it is beneficial to understand the current state of the art as it relates to transcoding digital content. FIG. 2A helps illustrate this batch wise transcoding process, shown generally at 200A. In the traditional transcoding process, each segment 210*a-n*, is converted/transcoded using the context of the segment immediately preceding it. This causes the entire content (made up of n segments) to be batch processed before the player device 120 is able to begin playing it. This causes a dependency between the content length and the transcoding time. This relationship is linear, and approximated by the following equation:

$$\text{Transcoding-time} = \text{video-duration} \times C$$

Where C is a constant based upon the transcoding service. Some transcoding services have much smaller values for the constant C, however, for longer videos, the transcoding time can still be significant. Table 1, shown below, provides examples of transcoding times based upon some exemplary differing transcoding services.

TABLE 1 relative transcoding times

| Transcoding service | Transcoding time for 10 minutes of content | Transcoding time for 180 minutes of content | Transcoding time for 7 days of content |
|---|---|---|---|
| Qumu (C = 1) | 10 minutes | 180 minutes | 10,080 minutes |
| Google/GCP (C = 0.5) | 5 minutes | 90 minutes | 5,040 minutes |
| Amazon/AWS (C = 0.3) | 3 minutes | 54 minutes | 3,024 minutes |
| Mux.com (C = 0.1) | 1 minute | 18 minutes | 1,008 minutes |

As can be seen, even for relatively short length content, the transcoding time may be untenable. The only option currently available to a streaming service (such as Netflix) is to perform these lengthy transcoding processes up-front, and then storing the transcoded content in their libraries.

Figure 2B:
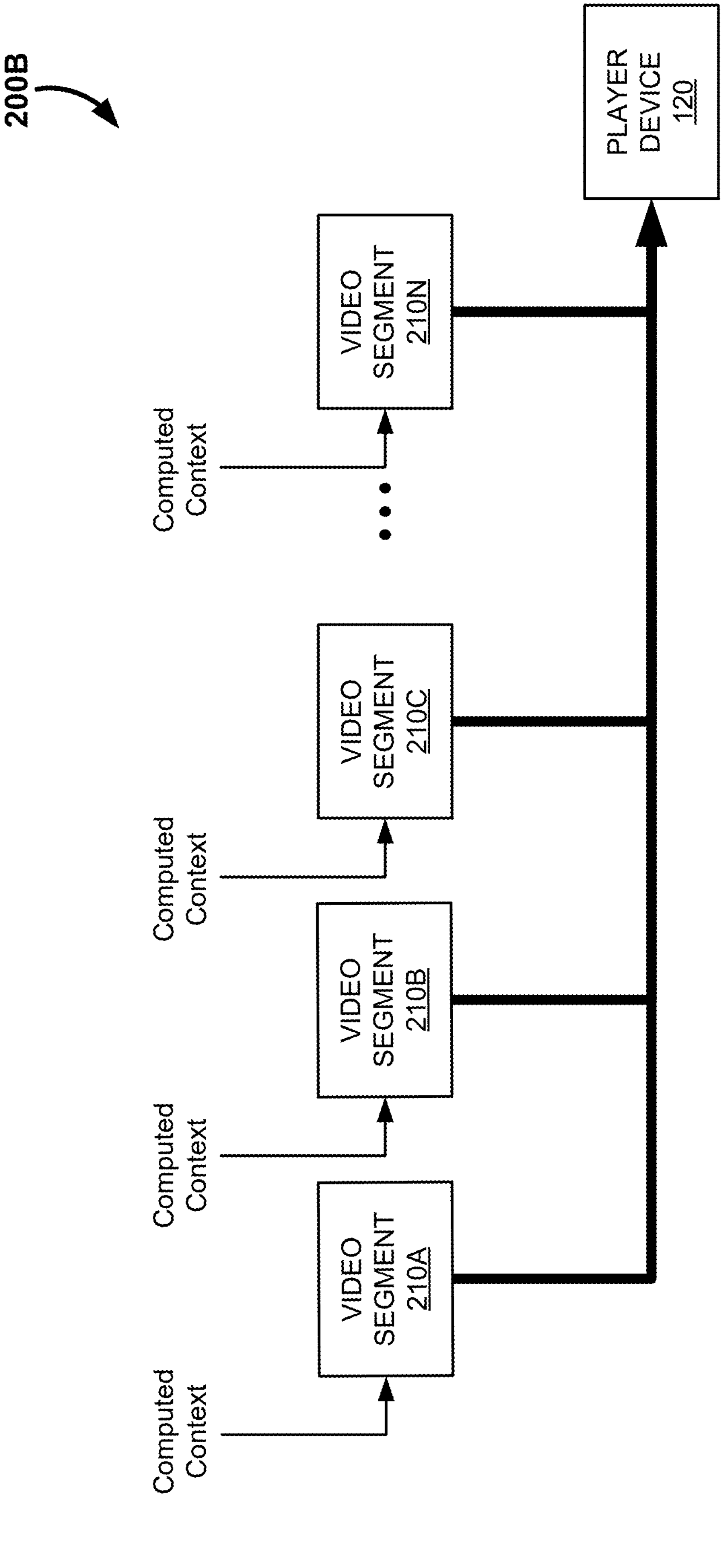
FIG. 2B is an example block diagram for a just in time (JIT) transcoding service, in accordance with some embodiment.

In contrast, the presently disclosed systems and methods avoid this latency in time before playback by leveraging what is known as just in time (JIT) transcoding. FIG. 2B illustrates, at a high level, the concept behind JIT VOD, shown generally at 200B. Again, we have a series of video segments 210*a-n*, but rather than relying upon the prior segment for context, the context is instead computed for the instant segment. As such, each segment is rendered as it is needed, in a serial manner, rather than as a batch. Thus, the player device 120 does not need to wait for the entire transcoding to occur before playback starts, instead it only has to wait a short constant period of time for the first segment to be transcoded. In practice, this constant is roughly 2 seconds, regardless of video length. It should be noted, however, that in some embodiments the time may vary from this constant. For example, as transcoding processes improve, the constant may decrease to one second or less. In other embodiments, where computational resources are more limited, the constant transcoding time may be greater than 2 seconds.

Figure 4:
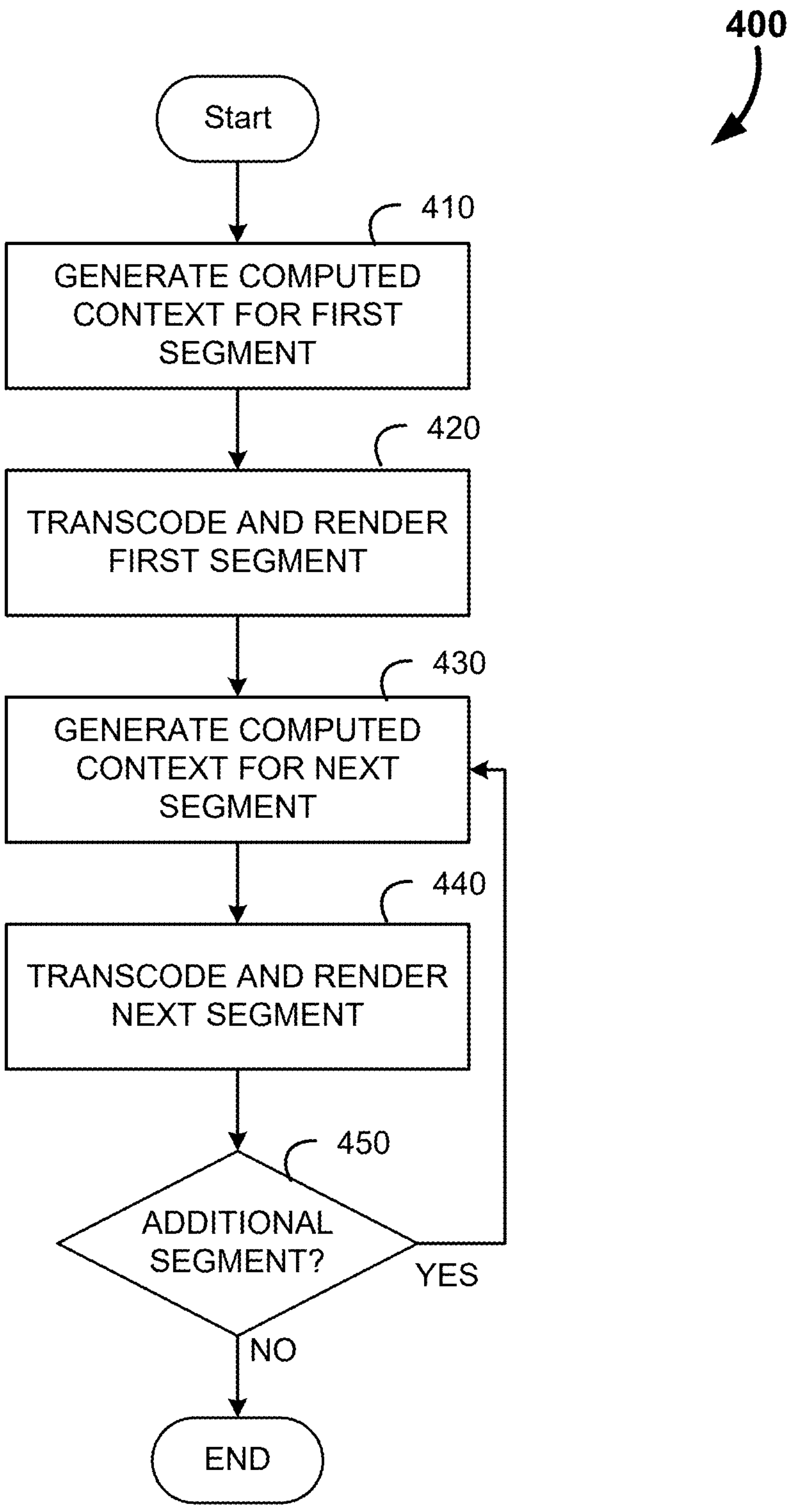
FIG. 4 provides a flow diagram for an example process of JIT transcoding, in accordance with some embodiments.

FIG. 4 provides a high-level diagram for the process of JIT VOD, shown generally at 400. In this process, the context is computed for the first segment (at 410). Context computation relies upon three requirements: 1) that the segment sizes are a predictable length, 2) that the presentation timestamps (PTS) are likewise predictable, and 3) that the prior, partial audio sample data is also predictable. This allows the context to be computed independently from the prior segment transcoding.

Generally, media segment sizes vary. This is because media segments contain a non-fractional number of video frames, and for audio, AAC or advanced audio coding (an audio coding standard for lossy digital audio compression) defines a unit packet that contains 1024 samples. Thus, the number of samples is divisible by 1024. As such, for example, if one were to ask ffmpeg (an open source suite of libraries and programs for video and audio handling) to generate HLS (HTTP live streaming) at 30 frames per second and at 48 Khz with ten second segments, the output would result in segments that vary in duration near the ten second mark (e.g., 9.8s, 10.1s, etc.). These durations are not predictable without using the context from the prior segment. In order to generate predictable media segment sizes, there are specific segment durations where both the audio and video conditions match. These segment durations are based upon when both audio sample rate and video frame rates match. Thus, for example, for a 25 frame per second video rate, at 48 Khz, the following table illustrates some possible segment durations:

TABLE 2

Example sample sizes for 25 fps

| Segment duration | Video Frames | Audio Frames |
|---|---|---|
| 1.92 seconds | 48 | 90 |
| 3.84 seconds | 96 | 180 |
| 6.4 seconds | 160 | 300 |

Likewise, for example, for a 30 frame per second video rate, at 48 Khz, the following table illustrates some possible segment durations:

TABLE 3

Example sample sizes for 30 fps

| Segment duration | Video Frames | Audio Frames |
|---|---|---|
| 1.6 seconds | 48 | 75 |
| 4.8 seconds | 144 | 225 |
| 6.4 seconds | 192 | 300 |

It should be noted that these tables provide only three example video frame and audio sample rates, whereas there are an infinite number available. All that matters is that the audio samples are divisible by 1024 and the video segment is a non-fractional number of frames.

Under some recommendations, however, the segment length is suggested to be approximately 6 seconds in length. Thus, using a predictable segment length of 6.4 seconds may be utilized in some particular embodiments.

Predictable PTS is then a function of the predictable segment length. HLS requires consecutive MPEG-TS segments to have monotonically increasing PTS. Beyond this, PTS is specified for video and audio samples, and correctly aligned to ensure audio and video synchronization. Since the segment length is a constant, predictable value, the exact play time can be computed for the start time of any given segment. ffmpeg enables the seeding of PTS offsets to begin from. This is computed by an offset value. Thus, PTS can be computed purely as a function of the relative play time of the segment being requested.

Predictable prior, partial audio sample data is a bit more complex. The AAC standard codec stipulates encoding of 1024 samples in units known as "packets". The encoding process itself operates as a function over consecutive 2048 samples. To decode sample data for a specific time, the 1024 samples immediately prior to the sample data being decoded are required.

Figure 3A:
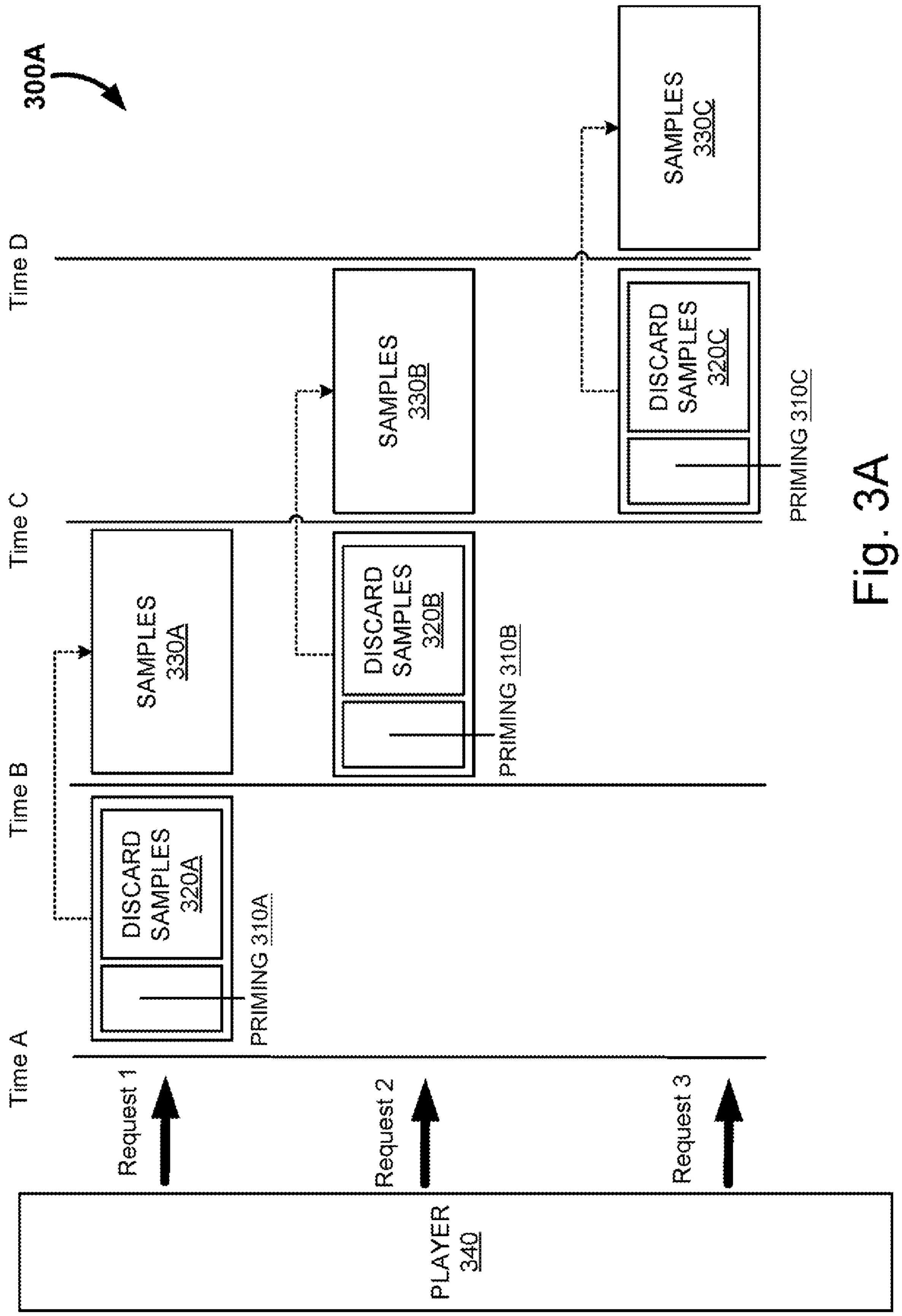
FIGS. 3A and 3B are example block diagrams for the audio transcoding process, in accordance with some embodiment.

To begin encoding, then, AAC requires 1024 'priming' samples to be prepended prior to the first sample of interest. These priming samples are silent. This causes two issues for JIT transcoding: 1) all AAC encoders insert priming samples for context-less encoding, and 2) without priming and without the prior 1024 sample context from the prior audio segment, encoding of the initial 1024 samples of the initial media segment is not possible (without introducing considerable audio artifacts). Thus a novel approach is taken to transcode the audio segments JIT. FIG. 3A provides a block diagram that helps in explaining this process, shown generally at 300A.

The solution is to generate the segment prior (at time A) to the segment of interest (at time B). This "garbage" segment includes the priming portion 310*a*, and samples for the rest of the segment 320*a* that can be discarded. This provides the context necessary for the following segments samples 330*a* (at time B). However, to compute the following segment (at time C), the same process occurs in parallel, with the priming 310*b* and garbage samples 320*b* being generated (at time B), and then the 'real' samples 330*b* (beginning at time C). This solution cascades, with each segment, such as sample segment 330*c*, preceded by a 'garbage segment' consisting of a priming portion 310*c* and a discarded sample segment 320*c*. This solves the issue of having context for each segment, but at a cost of doubling computational demands. However, the computational resources for encoding the audio are relatively minor, thus the additional overhead is warranted to enable JIT transcoding of the media.

Figure 3B:
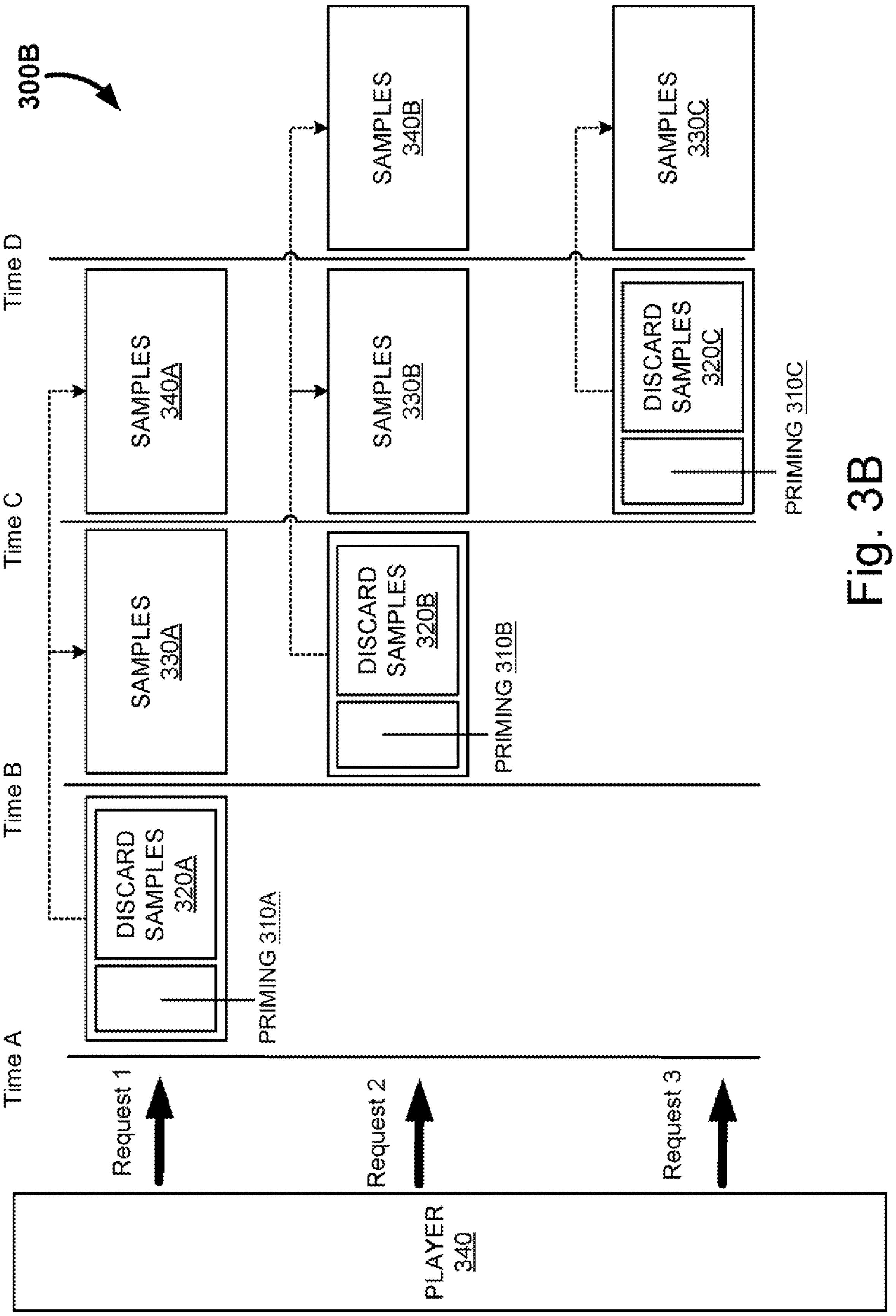

In an alternate embodiment, as seen at 300B of FIG. 3B, the same process may occur, however a "semi-batch" occurrence may exist. In such a process rather than having a single sample segment 330*a* generated for each priming segment 310*a*, a second (or more) sample segment 340*a* may be appended. In such a situation, it may be possible to request a new segment every third (or more) time segments, thereby reducing the overlap of the transcoded segments (here this is not illustrated to exemplify that request 2 also has two 'real' segments associated with the priming discarded segment). By reducing overlap, the computational demands may be reduced commensurately to the number of segments associated with the first priming segment. Alternatively, these 'redundant' segments may be employed to ensure synchronization of each audio segment, or correct for lost packets or other events that may introduce artifacts into the audio Returning to FIG. 4, after the context is computed, this initial segment may be transcoded and rendered at the player device (at 420). Computation, transcoding and rendering the first segment of the media content takes some constant period of time. As noted before, this constant may be no more than 2 seconds, with the exact value being a function of the video quality being generated but may be another number (as low as 500 ms) based upon computing resources available, and the exact transcoding protocols employed. This, then, is the period of time a user is required to wait before the video content is ready to play.

The process continues by computing the context for the subsequent segment (at 430) and then transcoding this subsequent segment and rendering it (at 440). As the context is computed without the need for the transcoding context from the prior segment, this process may be performed just before the next segment is to be rendered and played. This process is what is meant by "just in time" transcoding. A query is made if there is another segment (at 450) and if so, the process repeats for this next segment. This cascading calculating of context, and then transcoding of the content as it is required, ensures that the content is always available to the player, but the length of the transcoding process is divorced from the content length. This JIT transcoding process repeats until no additional segments are present (the end of the content), at which time the process finally ends.

Figure 5:
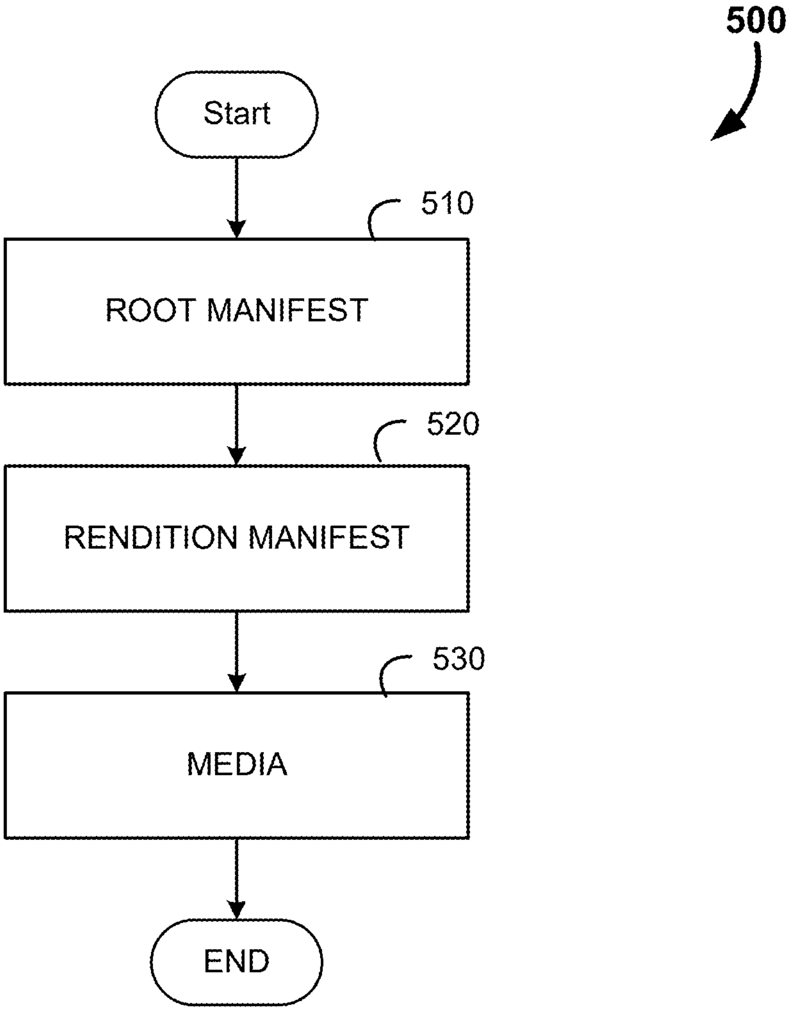
FIG. 5 provides a flow diagram for an example process of the mechanics of JIT transcoding, in accordance with some embodiments.

Now that the high-level process has been described, the mechanics of the transcoding process will be described in greater detail in relation to FIGS. 5-10. To start, FIG. 5 provides a high-level process diagram for the transcoding mechanics, shown generally at 500. There are three main elements to this process: root manifest (at 510), rendition manifest (at 520), and media generation (at 530). Each of these individual sub-processes will be described in greater detail in relation to the following Figures.

Figure 6:
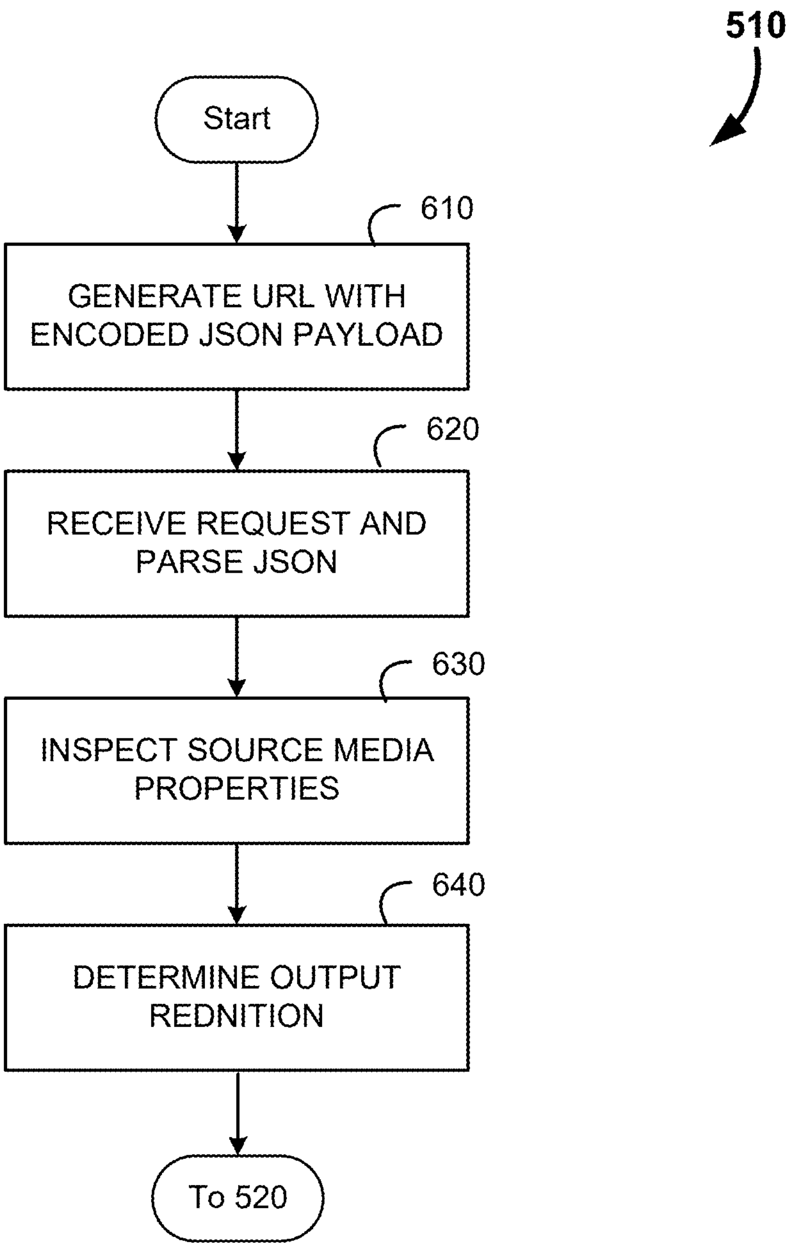
FIG. 6 provides a flow diagram for an example process of root manifest, in accordance with some embodiments.

For example, FIG. 6 provides a more detailed disclosure of the root manifest sub-process 510. The root manifest sub-process begins with the generation of a Uniform Resource Identifier (URI) with an encoded JSON payload as a path segment (at 610). The JSON includes a specification. This specification includes a listing of one or more source clips, optional trim parameters for the clips, and the output HLS renditions that are to be generated. This specification defines the resulting HLS the requester of the content wants the JIT transcoding service to generate. In some particular embodiments, the JSON is URL-safe Base64 encoded.

The request is then received, and the JSON is parsed (at 620), and the source media properties are inspected (at 630) using a probe command. From this data, the output of the rendition is determined (at 640). For example, rendition of a higher resolution output than the source resolution is nonsensical. This results in the return of a root manifest, with required state encoded in the relative rendition URIs. As noted before, audio and video are rendered in different streams, both to minimize bandwidth, and to allow for parallelism in separate player calls.

Figure 7:
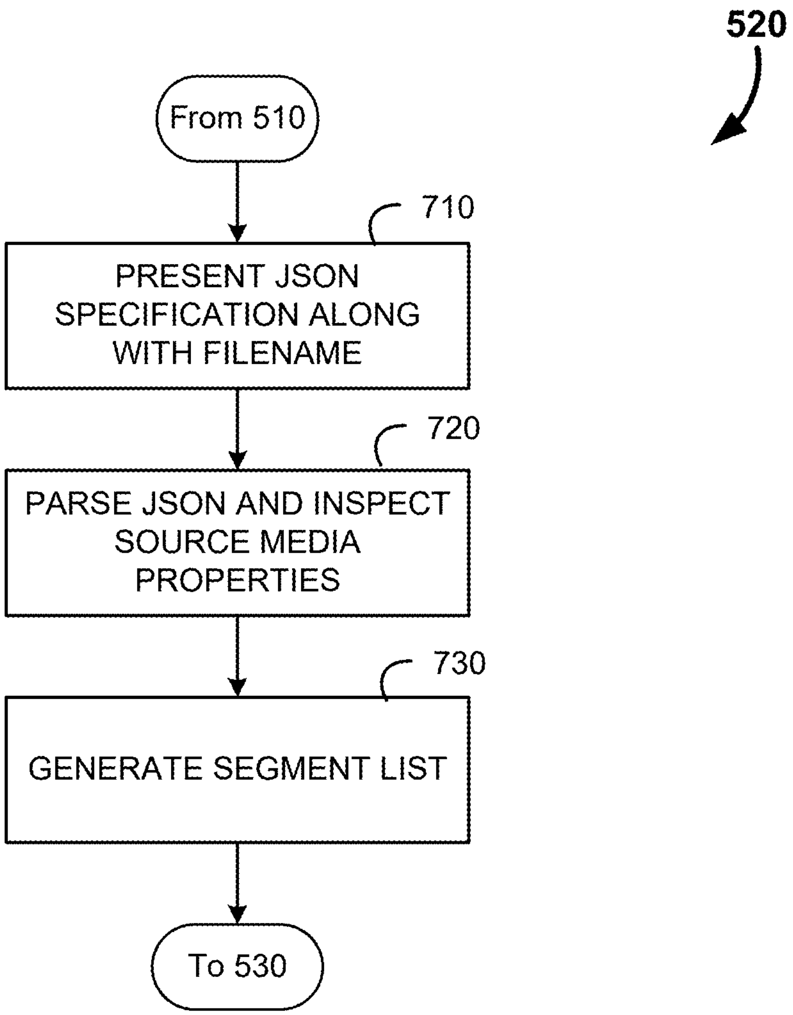
FIG. 7 provides a flow diagram for an example process of rendition manifest, in accordance with some embodiments.

Moving on, FIG. 7 describes the sub-process of rendition manifest, at 520. Here the JSON specification from before is presented, along with the file name indicating the specific HLS rendition and bitrate to generate the rendition manifest for (at 710). The JSON is again parsed, and the source media properties are inspected using a probe command (at 720). From this, a segment list is generated (at 730). This segment list is a set of relative segments URIs. The URIs encode per segment start and end positions relative to the source clip, whereby the start and end times are offset to adhere to the trim window. Also encoded are the target properties of the output media, i.e. the video dimensions and bitrate. As such the URI contains all the data required for the media generation/transcode at this point.

This generation process respects the source media duration in that it limits trim times to within the source duration. It also adjusts the rendition dimensions to maintain the source aspect ratio.

Figure 8:
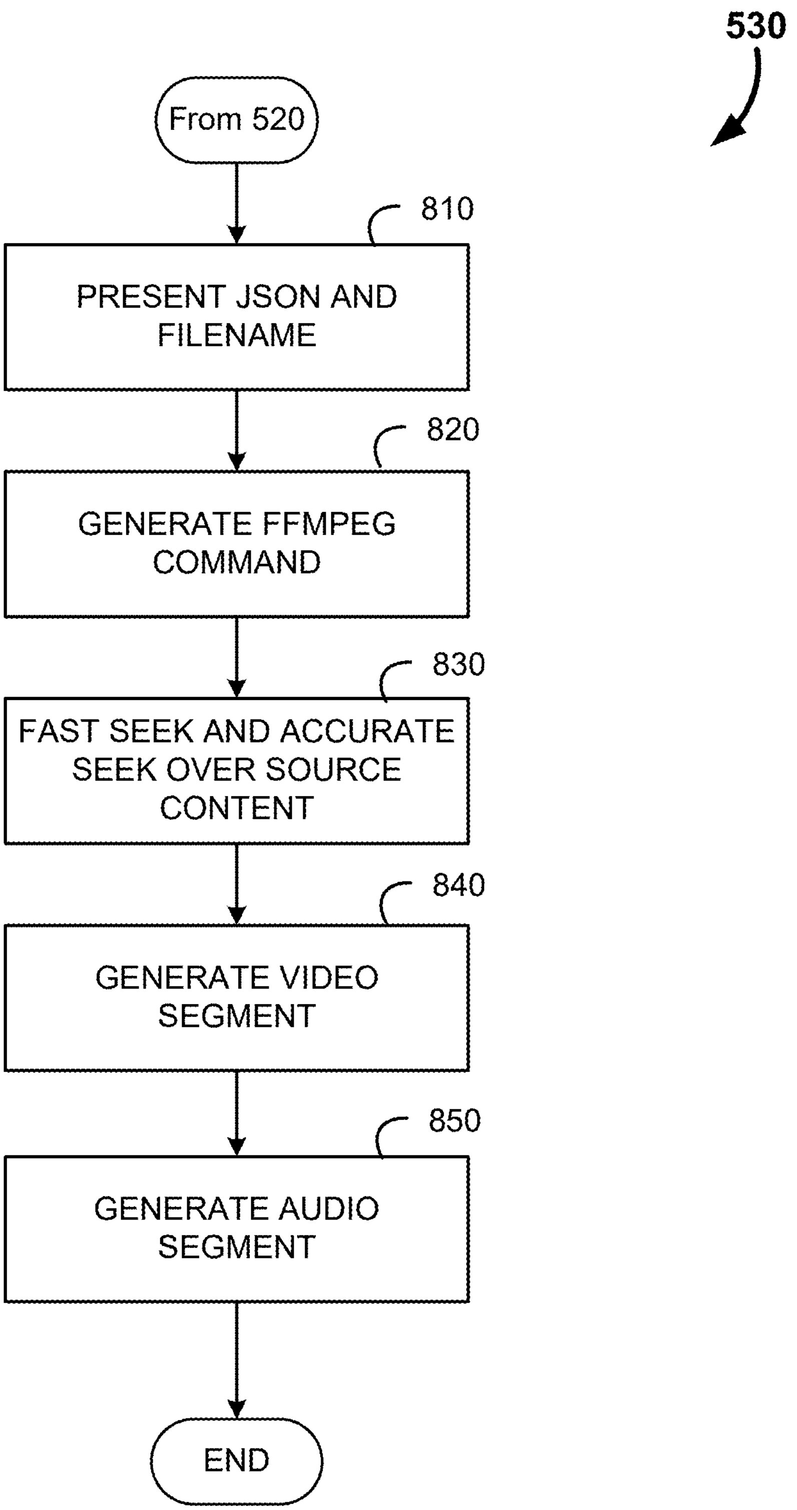
FIG. 8 provides a flow diagram for an example process of media generation, in accordance with some embodiments.

Turning now to FIG. 8, the sub-process of media generation is illustrated, at 530. Initially the JSON and filename from before are presented as part of the URI (at 810). The ffmpeg command is then generated using the JSON along with the properties defining the media segment which are contained in the filename (at 820). Fast seeking and accurate seeking over source content is performed (at 830). The 'fast seek' is required to quickly skip over source content not required for the segment being generated. This is required to be preformat over long sources, which ffmpeg supports. ffmpeg also supports very accurate sample seeking, thus avoiding missed frames and audio artifacts. The video segment is then generated (at 840), which is a relatively straightforward process. In some embodiments, the codec used for video encoding (e.g., h.264) supports IDR (i) frames. MPEG-TS segments begin with i-frames and thus do not require context from the prior segments. Thus, a seek for the appropriate video frames from the source data is performed using the defined seek time, duration of the segment, and the frame rate (frames per second). In some embodiments, the scene change detection features are disabled, which prevents extra i-frames from being inserted into the segment (causing synchronization issues due to the segment length being non-predictive), and the PTS values are flagged for the beginning of the media segment. In some embodiments, the duration is set to 6.4 seconds, the frame rate is 30 fps, which results in an i-frame every 192 frames, therefore forcing a keyframe at the beginning of each segment. PTS values are set per frame, which defines the playback time.

Figure 9:
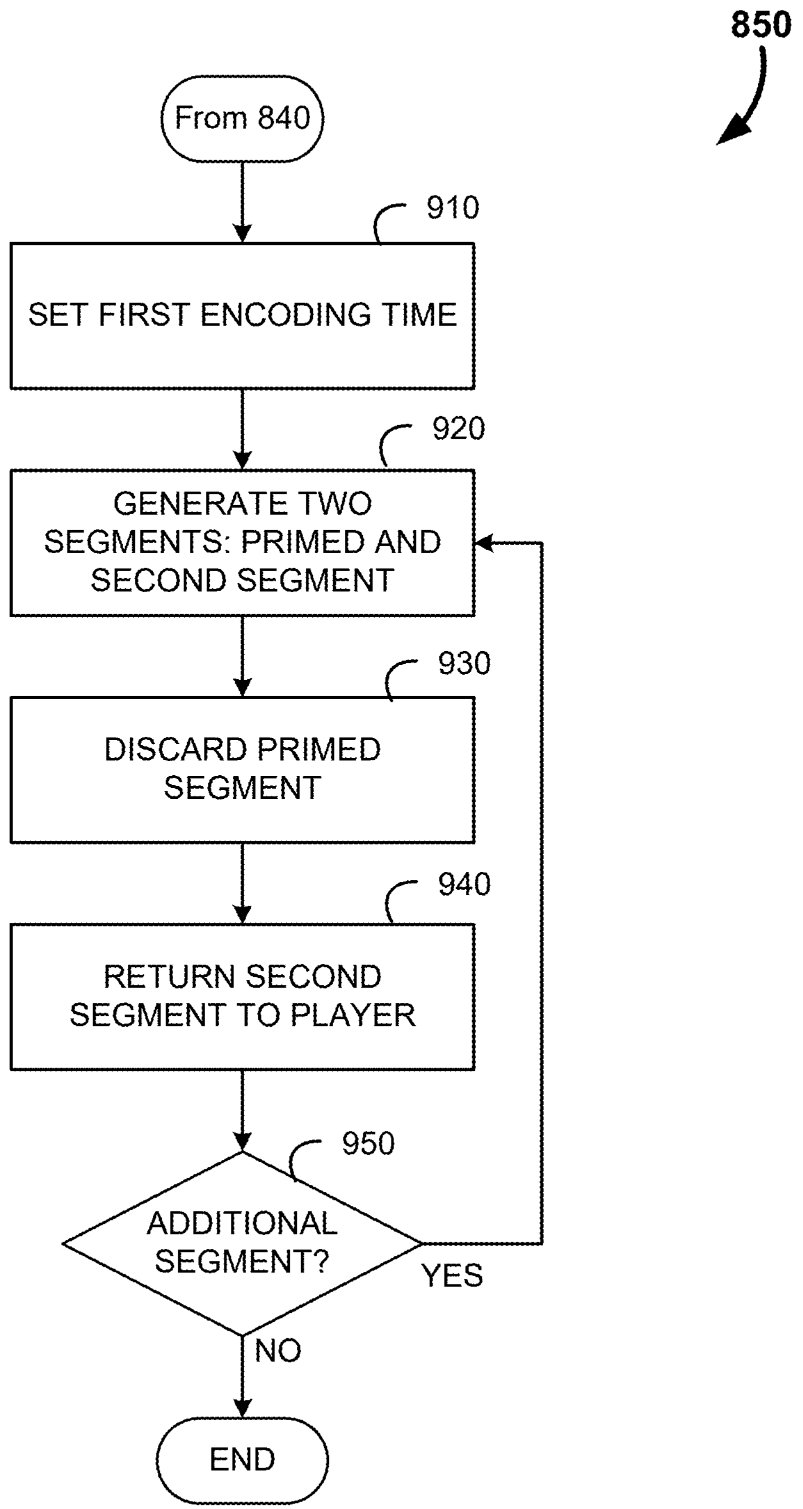
FIG. 9 provides a flow diagram for an example process of audio generation, in accordance with some embodiments.

Lastly, the audio segment is generated (at 850). Audio segment generation has already been touched upon in relation to FIG. 3. Additionally, FIG. 9 provides a flow diagram for the process of audio segment generation. In this example process, the first encoding time is set using the seek time from the URI, and then shifting back the time by one segment's duration (at 910). Likewise, the segment duration is set (the same as the video segment duration to ensure synchronization). A sample rate is also selected. In some particular embodiments this may be 48 Khz. A dummy segment if then generated, including a silent primed portion with discardable samples, followed by a 'real' segment with samples that are used by the player (at 920). The primed segment is discarded (at 930) and the real segment is returned to the player (at 950). If there are additional segments (at 950) the process repeats by generating the two segments. The new dummy segment is for the same segment as the prior 'real' segment, thereby ensuring that each timeframe includes a real segment for playback. This effectively doubles the computational overhead, however, this is acceptable as the computational resources required for audio encoding are already minimal.

Figure 10:
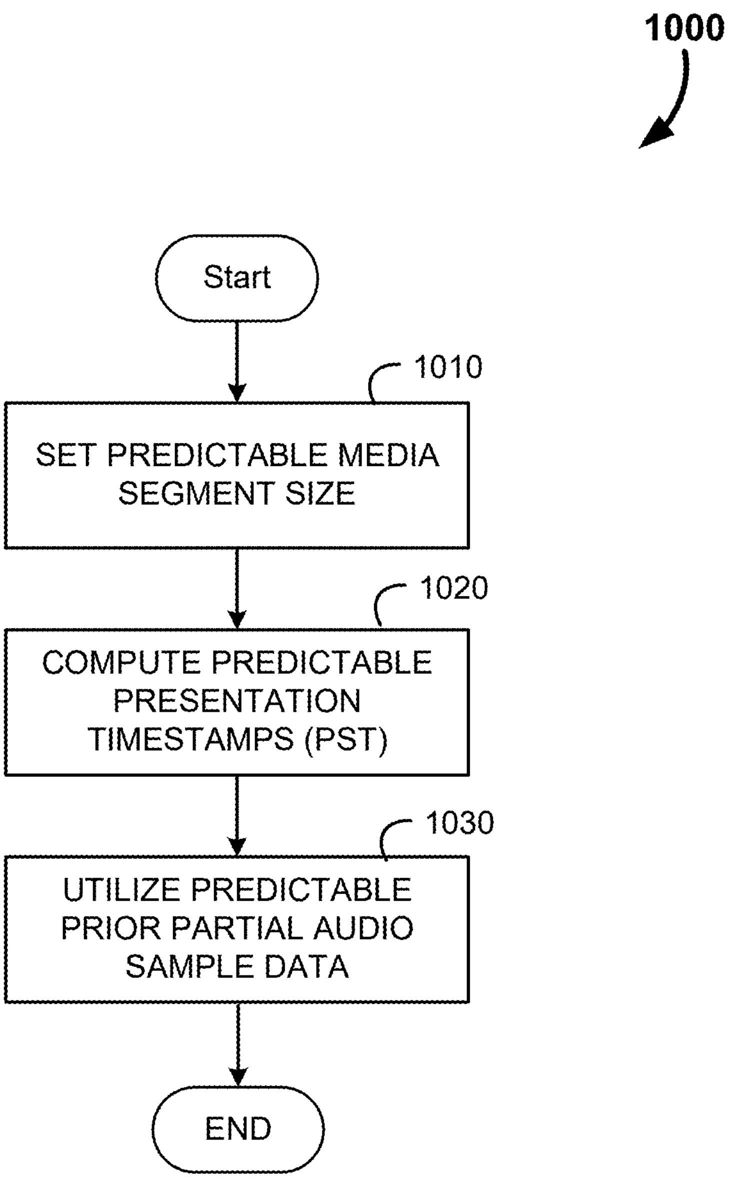
FIG. 10 provides a flow diagram for an example process of computing context, in accordance with some embodiments.

Turning now to FIG. 10, the conditions required for computing context are provided, at 1000. As noted in considerable detail above, this includes setting predictable media segment size (at 1010). In some embodiments, this may be either 25 or 30 frames per second, 48 Khz audio and 6.4 second segment duration. Next the predictable presentation timestamp (PTS) is computed for each video frame (at 1020). Lastly, predictable prior partial audio sample data is utilized (at 1030), as just disclosed, to ensure that the context for any given segment is computed and not reliant upon the prior segment.

Figure 11A:
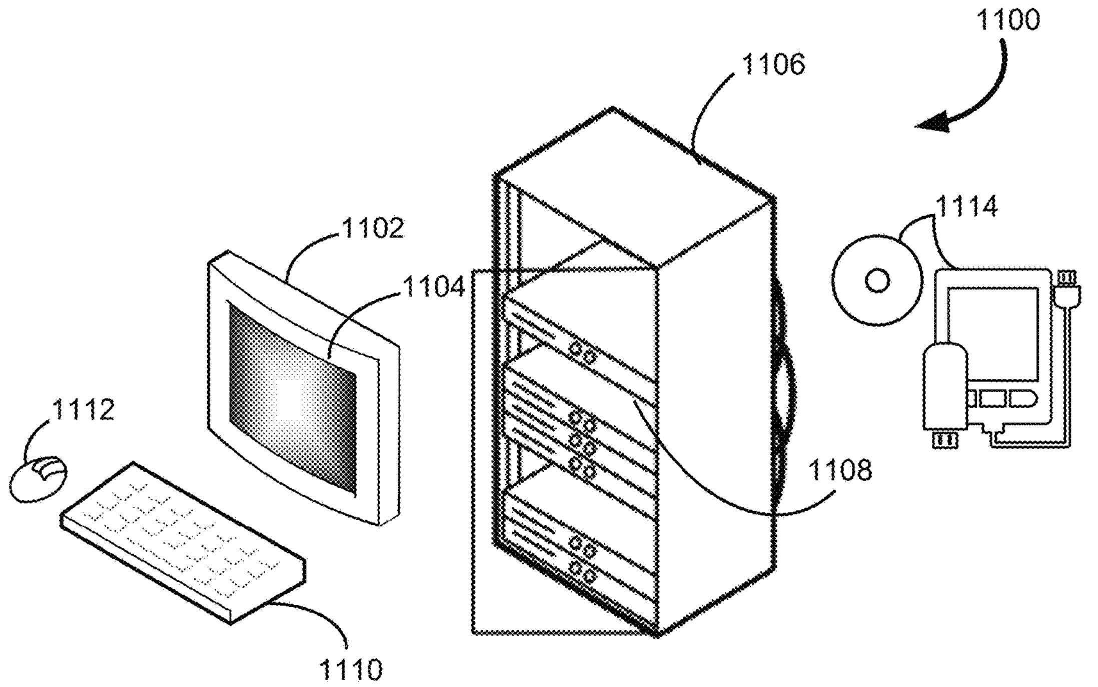
FIGS. 11A and 11B provide illustrations of possible computing devices capable of performing the above mentioned JIT transcoding processes, in accordance with some embodiments.
Figure 11B:
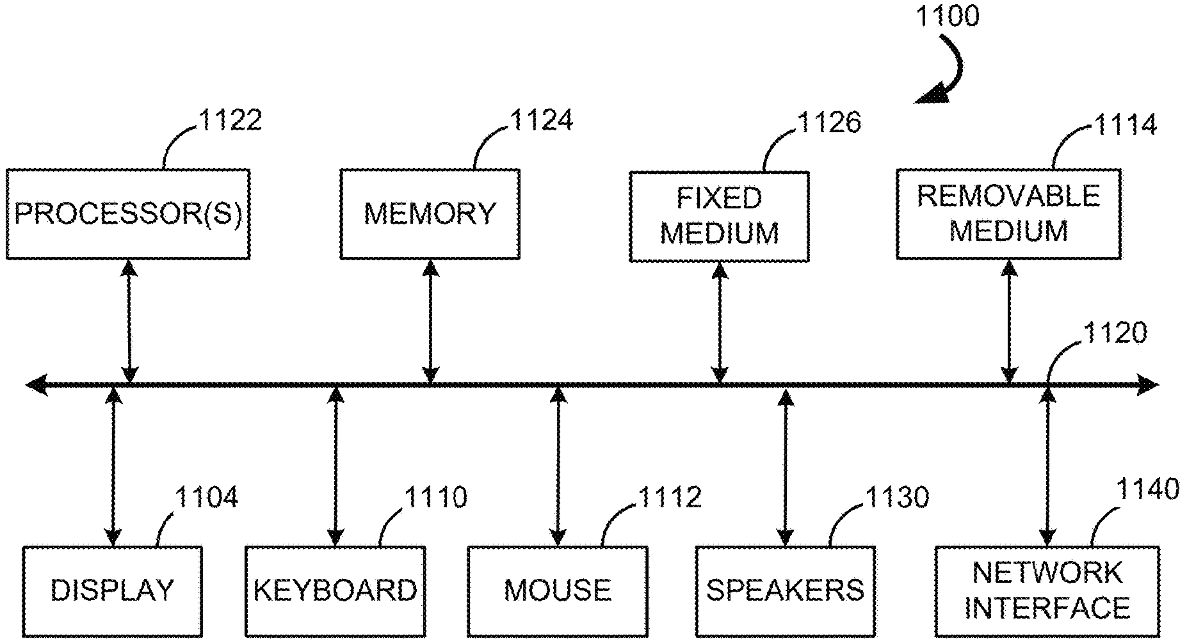

Now that the systems and methods for just in time transcoding of video on demand has been discussed in considerable detail, attention shall now be focused upon apparatuses capable of executing the above functions in real-time. To facilitate this discussion, FIGS. 11A and 11B illustrate a Computer System 1100, which is suitable for implementing embodiments of the present invention. FIG. 11A shows one possible physical form of the Computer System 1100. Of course, the Computer System 1100 may have many physical forms ranging from a printed circuit board, an integrated circuit, and a small handheld device up to a huge super computer. Computer system 1100 may include a Monitor 1102, a Display 1104, a Housing 1106, server blades including one or more storage Drives 1108, a Keyboard 1110, and a Mouse 1112. Medium 1114 is a computer-readable medium used to transfer data to and from Computer System 1100.

FIG. 11B is an example of a block diagram for Computer System 1100. Attached to System Bus 1120 are a wide variety of subsystems. Processor(s) 1122 (also referred to as central processing units, or CPUs) are coupled to storage devices, including Memory 1124. Memory 1124 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 1126 may also be coupled bi-directionally to the Processor 1122; it provides additional data storage capacity and may also include any of the computer-readable media described below. Fixed Medium 1126 may be used to store programs, data, and the like and is typically a secondary storage medium (such as a hard disk) that is slower than primary storage. It may be appreciated that the information retained within Fixed Medium 1126 may, in appropriate cases, be incorporated in standard fashion as virtual memory in Memory 1124. Removable Medium 1114 may take the form of any of the computer-readable media described below.

Processor 1122 is also coupled to a variety of input/output devices, such as Display 1104, Keyboard 1110, Mouse 1112 and Speakers 1130. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1122 optionally may be coupled to another computer or telecommunications network using Network Interface 1140. With such a Network Interface 1140, it is contemplated that the Processor 1122 might receive information from the network, or might output information to the network in the course of performing the above-described transcoding services. Furthermore, method embodiments of the present invention may execute solely upon Processor 1122 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1100 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems may appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method for just in time (JIT) video on demand (VOD) transcoding, the method comprising:
- using one or more processors:
  - generating a computing context for a first video segment by:
    - setting a predictable media segment size;
    - computing a first predictable playback time stamp as a function of the predictable media segment size and a derived time offset value;
    - for the first video segment, generating a prior audio segment including a priming portion and discard sample portion, and a real audio segment including playback samples wherein the prior audio segment precedes the real audio segment; and
  - transcoding the first video segment; and
  - generating a computing context for a second video segment by:
    - using the predictable media segment size and the derived time offset value, computing a second predictable playback time stamp; and
    - for the second video segment, generating a prior audio segment including a priming portion and discard sample portion, and a real audio segment including playback samples, wherein the prior audio segment precedes the real audio segment; and transcoding the second video segment;

wherein at least a portion of the prior audio segment and real audio segment of the first video segment is simultaneously encoded with at least a portion of the prior audio segment and real audio segment of the second video segment.

2. The method of claim 1, wherein the predictable media segment size is 6.4 seconds.

3. The method of claim 1, wherein the predictable media segment size is 8 seconds.

4. The method of claim 1, further comprising setting an audio sample rate to 48 Khz.

5. The method of claim 1, further comprising setting a video frame rate to 25 frames per second.

6. The method of claim 1, further comprising setting a video frame rate to 30 frames per second.

7. The method of claim 1, wherein the priming portion is 1024 samples.

8. The method of claim 1, wherein the samples of the priming portion are silent.

9. The method of claim 1, further comprising rendering video by fast and accurate seeking to a user specified frame and rendering the segment starting with an i-frame.

10. The method of claim 1, further comprising generating a root manifest and a rendition manifest while transcoding.

11. A computerized program product stored on a non-transitory memory, that when executed by one or more processors comprised in a computer system performs:

generating a computing context for a first video segment by:

setting a predictable media segment size;

computing a first predictable playback time stamp as a function of the predictable media segment size and a derived time offset value;

for the first video segment, generating a prior audio segment including a priming portion and discard sample portion, and a real audio segment including playback samples wherein the prior audio segment precedes a corresponding real audio segment, transcoding the first video segment; and generating a computing context for a second video segment by:

using the predictable media segment size and the derived time offset value, computing a second predictable playback time stamp; and for the second video segment, generating a prior audio segment including a priming portion and discard sample portion, and a real audio segment including playback samples, wherein the prior audio segment precedes the real audio segment; and transcoding the second video segment;

wherein at least a portion of the prior audio segment and real audio segment of the first video segment is simultaneously encoded with at least a portion of the prior audio segment and real audio segment of the second video segment.

12. The computer program product of claim 11, wherein the predictable media segment size is 6.4 seconds.

13. The computer program product of claim 11, wherein the predictable media segment size is 8 seconds.

14. The computer program product of claim 11, when executed by the computer system performs the additional step of setting an audio sample rate to 48 Khz.

15. The computer program product of claim 11, when executed by the computer system performs the additional step of setting a video frame rate to 25 frames per second.

16. The computer program product of claim 11, when executed by the computer system performs the additional step of setting a video frame rate to 30 frames per second.

17. The computer program product of claim 11, wherein the priming portion is 1024 samples.

18. The computer program product of claim 11, wherein the samples of the priming portion are silent.

19. The computer program product of claim 11, when executed by the computer system performs the additional step of rendering video by fast and accurate seeking to a user specified frame and rendering the segment starting with an i-frame.

20. The computer program product of claim 11, when executed by the computer system performs the additional step of generating a root manifest and a rendition manifest while transcoding.

* * * * *